Oct. 31, 1972     W. J. VAN DER BURG     3,701,778
DIBENZO-PYRAZINO-AZEPINES
Filed June 26, 1968
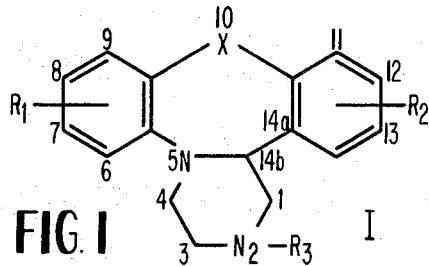
FIG. 1    I
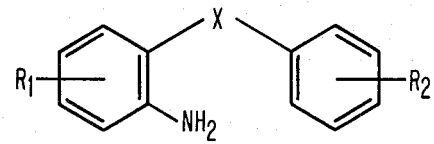
FIG. 2    II
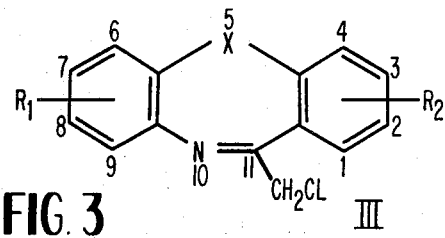
FIG. 3    III
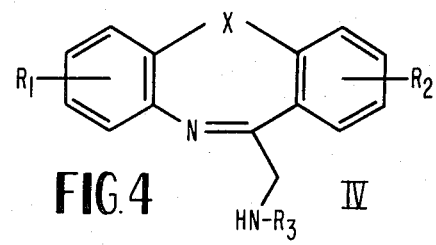
FIG. 4    IV
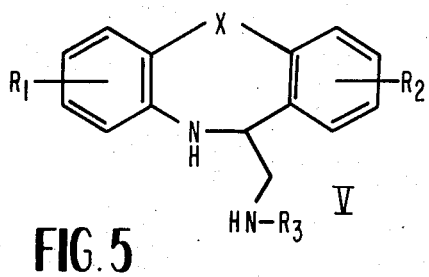
FIG. 5    V
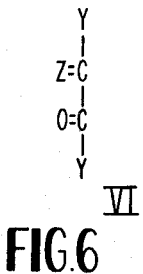
FIG. 6    VI
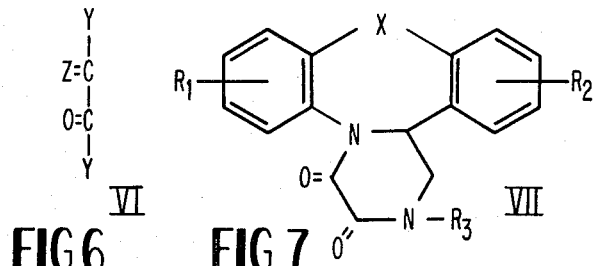
FIG. 7    VII
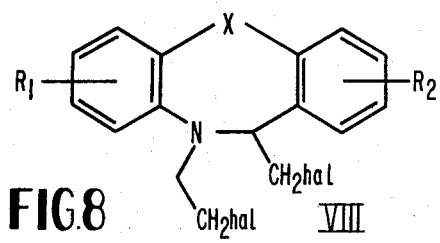
FIG. 8    VIII
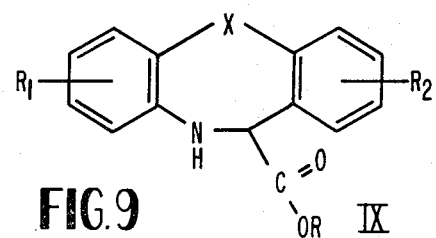
FIG. 9    IX
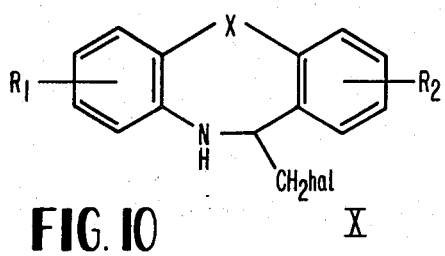
FIG. 10    X
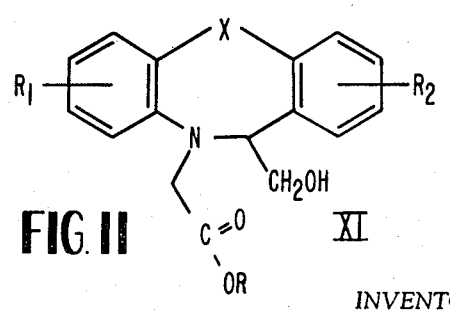
FIG. 11    XI
INVENTOR.
WILLEM J. VAN DER BURG
BY *Hugo E. Weisberger*
ATTORNEY United States Patent Office
3,701,778
Patented Oct. 31, 1972

3,701,778
DIBENZO-PYRAZINO-AZEPINES
Willem Jacob van der Burg, Oss, Netherlands, assignor to
Organon Inc., West Orange, N.J.
Filed June 26, 1968, Ser. No. 740,319
Claims priority, application Netherlands, July 7, 1967,
6709520
Int. Cl. C07d 51/72
U.S. Cl. 260—268 PC                              7 Claims

ABSTRACT OF THE DISCLOSURE

The present invention relates to new piperazine derivatives of the general formula:

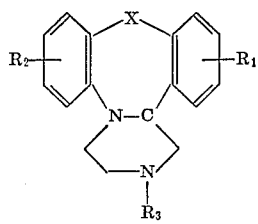

in which X is sulfur, oxygen, or N-($C_1$-$C_6$-alkyl); $R_1$ and $R_2$ are hydrogen, halogen, acyloxy, alkyl, alkoxy or trifluoromethyl; $R_3$ is hydrogen, alkyl, phenylalkyl aminoethyl or aminopropyl each of which latter may be substituted at N by alkyl or alkyl with a 5- or 6-membered nitrogen containing ring; and the acid addition salts, quarternary ammonium derivatives, nitrogen oxides, or sulfur oxides thereof. The above compounds exert antihistaminic, antiserotinic, antiinflammatory and cardiovascular activities and the intermediate products exert sedative, tranquilizing and anti-depressive activities.

---

The invention relates to the manufacture of new piperazine derivatives of the general Formula I of the sheet of drawings, in which $R_1$ and $R_2$ represent hydrogen, halogen, hydroxyl acyloxy, lower alkyl or alkoxy or trifluoro methyl groups, and $R_3$ hydrogen, a lower alkyl or aralkyl group, or an aminoethyl or aminopropyl group substituted at N by a lower alkyl group, or a lower alkyl group with a nitrogen containing heterocyclic ring, and X oxygen, sulphur or $NR_4$, in which $R_4$ represents a lower alkyl group, and functional derivatives thereof.

This new class of biologically active compounds exert anti-inflammatory, anti-serotinic, anti-histaminic activities.. The compounds can be administered orally for instance as powders or tablets, in the form of suppositories, by intramuscular or subcutaneous injections and as sniff powder, for example in the form of sprays, in doses between 0.5 and 800 mg. a day.

The above-mentioned new class of biologically active compounds can be prepared by any method known for the synthesis of such compounds.

The present compounds can be prepared most advantageously by reducing a corresponding compound in which there are one or more keto groups in positions 1, 3 and 4 of the ring system of Formula I.

The above reduction of the mono and diketopiperazines is preferably performed with metalhydrides, preferably alkali-metal aluminum- or boriumhydrides, for example LiAlH$_4$ or NaBH$_4$ and particularly with diboran, or with a mixture of the latter reducing agents, or with diisobutyl aluminum hydride. It is also possible to apply catalytic hydrogenation with, for instance, Raney nickel or Adams platinum catalyst.

The final products of the method of preparation are called dibenzo-pyrazino-oxazepines, dibenzo - pyrazino- thiazepines and dibenzo-pyrazino-diazepines respectively according to whether X represents oxygen, sulphur or nitrogen.

The preferred starting product in the synthesis of these compounds is an ortho-amino-diphenylether, an ortho-amino-diphenylthioether or an ortho - amino - diphenylamine of Formula II, which is acylated with chloroacetyl chloride and then converted into the tricyclic compound of Formula III, called dibenzo-oxazepine, dibenzo-thiazepine and dibenzo-diazepine respectively by heating with phosphoroxychloride and polyphosphoric acid or polyphosphoric acid esters. From these compounds the desired final products can be synthesised along various routes by building up the piperazine ring. Thus, for example, the desired piperazine ring can be obtained by starting from a compound of Formula VIII, in which $R_1$, $R_2$ and X have the meaning mentioned above and hal represents halogen, by reaction with an amine $R_3NH_2$, in which $R_3$ has the meaning stated above.

Further the 1-keto derivatives of the compounds according to Formula I can be prepared by reacting a compound of Formula IX, in which $R_1$, $R_2$ and X have the above-mentioned meaning, and R represents a lower alkyl group with 1–6 carbon atoms with the compound hal—$CH_2$—CN, in which hal represents a halogen atom, followed by catalytic hydrogenation of the resulting nitrile and cyclisation of the thus obtained amine by intramolecular aminolysis. But the following method of preparation is preferred: the compound of Formula III is converted with the desired amine $H_2NR_3$ into a compound of Formula IV and then reduced at the 10–11 position to compound V.

These likewise new diamines according to the Formulae IV and V of the sheet of drawings show in themselves useful biological activities too. They exert sedative, tranquilizing and anti-depressive activities and they can be used in the same doses and in the same manner as indicated for the compounds according to Formula I of the sheet of drawings. The reduction in the 10–11 position can be performed by any method known per se for such compounds, for example, with a metalhydride, e.g. LiAlH$_4$, NaBH$_4$, diboran or diisobutyl-aluminiumhydride, but also by catalytic hydrogenation in the presence of a metal or metal derivative such as platinum, palladium or Raney nickel.

Preferably the biologically active compounds of the general Formulae IV and V of the sheet of drawings are converted into functional derivatives. By functional derivatives are meant the acid addition salts derived from organic or inorganic acids, such as for example, the HCl salt, the maleate, succinate, citrate or phosphate, the quaternary ammonium compounds obtained, for example, by alkylation by means of alkyliodide, preferably methyl iodide, the nitrogen oxides obtained with strong oxidants preferably $H_2O_2$ or peracids, and sulfoxides and sulfones of the compounds IV and V, in which X represents a sulphur atom, obtained by oxidation with strong oxidants, such as $H_2O_2$ and periodic acid.

By reacting the compound V with a compound of Formula VI, in which Y represents halogen or an alkoxy group with 1–6 carbon atoms and Z hydrogen or oxygen, a 3-keto or 3,4-diketo-piperazine can be obtained. By preference a dialkyl-oxalate is applied, such as the dimethyl- and diethylester to obtain a 3,4-diketo-piperazine.

With a diamine according to Formula V the 4-keto piperazines can be obtained in a simple manner by building up the piperazine ring at the ring nitrogen atom while blocking the amino group of the side chain. For this purpose the diamine of Formula V, in which $R_1$, $R_2$ and X have the meaning indicated above, and $R_3$ represents hydrogen, is reacted with a halo acetic acid halide in a solution buffered at a suitable pH, dependent upon the ionisation constants of the two amino groups, after which the resulting product is closed to a piperazine ring whether or not under the influence of a base.

A very good method of preparation of the 1,4-diketopiperazine according to the invention consists in the conversion of a compound of Formula IX with the compound hal-CH$_2$-CO-hal, in which hal represents a halogen atom, followed by the reaction of the resulting condensation product with the amine R$_3$NH$_2$.

It is also possible to react a compound of Formula IX with the compound hal-CH$_2$-COOR and to convert the resulting diester with the amine R$_3$NH$_2$ to form the 1,3-diketo-piperazine.

The intermediate product of Formula VIII, in which hal represents halogen, which yields the desired final products by condensing it with the amine R$_3$NH$_2$, can be prepared from a compound of Formula XI by reducing the ester group to the corresponding alcohol group and halogenating the diol with for example, thionyl chloride.

Finally the present compounds can be prepared by reacting a compound of Formula X, in which hal represents halogen and R$_1$, R$_2$ and X have the meaning indicated above, with hal-CO-CH$_2$-hal. Then the resulting halogen-acetyl derivative is converted into the 4-keto-piperazine derivative with R$_3$NH$_2$.

By lower alkyl group is meant an alkyl group with 1–6 carbon atoms. The same applies to lower alkoxy group.

The grouping R$_3$ in Formula I can be introduced during the synthesis or after it by substituting the hydrogen at the nitrogen atom at the 2-position of the piperazine ring. The heterocyclic N-containing ring, with which a lower alkyl group (R$_3$) may be substituted, is for instance the pyridine, imidazol, pyridazine, pyrimidine, pyrazine, morphine, pyrrole or pyrrolidine ring.

The substitution of a methyl group at the N atom at the 2-position in Formula I by hydrogen is preferably performed by a reaction in accordance with von Braun (Organic Reactions VII, pp. 198–262 (1953)). By converting the free amine with, for example, benzoyl chloride, followed by reduction of the resulting N-benzoyl group with diborane the N-benzyl compound is obtained as final product. By converting the free amine with acetyl chloride or acetic anhydride, followed by reduction of the resulting N-acetyl group with lithium aluminium hydride the 2-(N)-ethyl compound is obtained.

The compounds in which X represents nitrogen, substituted by a lower alkyl group, can be prepared quite easily by applying an ortho-amino-diphenyl-amine substituted analogously of Formula II as starting product.

From the compounds according to the invention functional derivatives can be prepared also falling within the scope of the invention.

By functional derivatives are meant:

(1) The acid addition salts of therapeutically acceptable inorganic and organic acids, such as hydrochloride acid, sulphuric acid, hydrobromic acid or phosphoric acid and acetic acid, propionic acid, cyclohexylpropionic acid, phenylpropionic acid, tartaric acid, malic acid, itric acid, ascorbic acid, gluconic acid, mandelic aid, lactic acid, benzoic acid, fumaric acid, maleic acid, methane and ethanesulfonic acid, succinic acid, aspartic acid, glutamic acid and sulfaminic acid.

(2) The quaternary ammonium compounds, the biological activity of which is often stronger than that of the original compound, which may be prepared preferably with the aid of alkyliodide, for example methyliodide.

(3) The nitrogen oxides, which may be prepared with, for example, a peracid.

(4) The sulphoxides (>S=O) and the sulphones

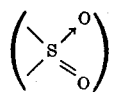

of the thiazepines according to the invention, which can be prepared by oxidation with hydrogen-peroxide or periodic acid, if required, while heating.

The new compounds may be applied as drugs, for example, in the form of pharmaceutical preparations. For that purpose they are mixed with one or more pharmaceutical vehicles suitable for oral administration, or with liquid or solid auxiliaries, such as water, benzylalcohol, propylene glycol, polyalkylene glycols, vegetable oils, gelatin, starch, lactose and magnesium stearate. The preparations may be shaped into tablets, coated tablets, grains, pills or capsules, or they may occur in liquid form, such as solutions, emulsions or suspensions. In the latter form they are suitable too for intramuscular or subcutaneous injections. Furthermore they may be used in the form of suppositories. They may also contain the required auxiliaries such as, fillers, lubricants, preservatives and emulsifying agents and are prepared by any method known per se.

The daily dosage may vary from 0.5 to 800 m. grams of the active substance, dependent upon the way in which they are to be administered, as well as the nature and the degree of the biological activity.

The compounds may also be applied for external use by introducing them into a spray together with a suitable propellant and, if desired, a solvent, further as a fine powder together with a suitable filler, and as a cream in combination with known auxiliaries.

The following examples illustrate the invention further.

EXAMPLE I (a) Ortho-chloroacetamido-diphenylether

A solution of 4.5 ml. of chloroacetyl chloride in 9 ml. of benzene is added dropwise, while stirring, to a solution of 5.55 gm. of ortho-amino-diphenylether in 28 ml. of benzene and 18 ml. of a concentrated solution of sodium hydroxide, cooled down to 5–10° C. Then the mixture is heated to room temperature and stirred for two hours. The organic layer is decanted, washed with a solution of 2 N hydrochloric acid, then with water, and then dried on anhydrous sodium sulphate. After removal of the solvent 4.5 gm. of ortho-chloroacetamido-diphenylether is obtained. Melting point: 76–78° C.; yield: 57.3%. Melting point after recrystallisation in a mixture of ethylacetate and petroleumether: 77.5–78.5° C.

Analysis.—Calculated for C$_{14}$H$_{12}$O$_2$NCl (percent): C, 64.25; H, 4.63; N, 5.36; Cl, 13.54. Found (percent): C, 64.73; H, 4.81; N, 5.63; Cl, 13.87.

(b) 11-chloromethyldibenzo-(b,f)(1,4)-oxazepine

A mixture of 5 gm. of ortho-chloroacetamido-diphenylether, 7 ml. of phosphoroxy chloride and 40 gm. of polyphosphoric acid, is heated for two hours in nitrogen atmosphere, while stirring, at 120–130° C. After cooling down the mixture is poured on 150 gm. of ice, whereupon the resulting suspension is extracted with benzene. The resulting organic extract is washed with a 10% sodium carbonate solution and finally with water. After drying on anhydrous sodium sulphate and evaporation of the solvent 4.2 gm. of an oily product is obtained, which crystallises by scratching. Melting point: 94–95° C.; yield: 87%. Melting point after recrystallisation from a mixture of benzene-petroleumether: 95–97° C.

Analysis.—Calculated for C$_{14}$H$_{10}$ONCl (percent): C, 68.99; H, 4.14; N, 5.75; Cl,14.53. Found (percent): C, 69.22; H, 4.06; N, 5.88; Cl, 15.19.

In the same manner the 8-methoxy-11-chloromethyl-dibenzo-(b,f)(1,4)-oxazepine is obtained starting from 2-chloro-acetamido-4-methoxy-diphenylether; melting point 126–128° C.

(c) 11-methylaminomethyl-dibenzo-(b,f)(1,4)-oxazepine

The temperature of a solution of 2.5 gm. of the chloromethyl compound of Ib in 50 ml. of a solution of methylamine in benzene (14%) is maintained at 5–10° C. for 24 hours. Then the solution is washed several times with water, then dried on anhydrous sodium sulphate and evaporated to obtain 2.3 gm. of an oily product, which is converted in the next step.

(d) 11-methylaminomethyl-10,11-dihydro-dibenzo-(b,f)(1,4)-oxazepine

A solution of 2.3 gm. of the product obtained under (c) in 25 ml. of anhydrous ether is added dropwise to a suspension of 600 mg. of lithium aluminum hydride in 25 ml. of anhydrous ether cooled down to 5° C. Then the mixture is refluxed for two hours after which it is cooled down. Then 2.4 ml. of water is added. After filtration on anhydrous sodium sulphate the solvent is evaporated to obtain 2.2 gm. of substance, which is directly processed further.

(e) 2-(N)-methyl-1,3,4,14b-tetrahydro-3,4-dioxo-2H-pyrazino-(1,2-d)-dizenzo-(b,f)(1,4)-oxazepine A mixture of 2.2 gm. of the substance obtained under (d) and 2.2 ml. of diethyloxalate is heated on a metal bath from 20 to 180° in 30 minutes, which temperature is maintained for 90 minutes. Then the mixture is cooled down and diluted with ether to obtain 1.3 gm. of a crystallised product. Melting point: 248–253° C.; yield 43% (calculated on the chloromethyl derivative). Melting point after recrystallisation from dimethylformamide: 260–266° C.

*Analysis.*—Calculated for $C_{17}H_{14}N_2O_3$ (percent): C, 69.38; H, 4.79; N, 9.52. Found (percent): C, 69.50; H, 4.93; N, 9.79.

(f) 2-(N)-methyl-1,3,4,14b-tetrahydro-2H-pyrazino-(1,2-d)-dibenzo-(b,f)(1,4)-oxazepine A suspension of 8 gm. of the diketo piperazine mentioned before in 300 ml. of anhydrous tetrahydrofuran is passed into a 3-necked flask fitted with stirrer, cooler and gas inlet tube. The mixture is refluxed, whereupon diboran is passed into it in a dry current of nitrogen. The required quantity of diboran is obtained by adding a solution of 36.5 ml. of boron trifluoride etherate in 7.7 ml. of di-methoxy-diethylether to a suspension of 8.5 gm. of sodium borohydride in 32.5 ml. of dimethoxy-diethylether, while stirring. Then the mixture is refluxed for 1 hour in a current of nitrogen. Then the suspension is cooled down to 5–10° C., whereupon ethanol is added till the precipitate has disappeared. Then the solvent is evaporated and the residue treated with 180 ml. of an 18% hydrochloric acid solution. Then the solution is left on a water bath for 4 hours. After cooling down the mixture is rendered alkaline with a 5 N sodium hydroxide solution and then extracted with chloroform. The organic layer obtained is washed with water, dried on anhydrous sodium sulphate and concentrated. Then the resulting crude product is dissolved in petroleumether, filtered and evaporated to obtain 5.9 gm. of an oily product, which is converted into the monochlorohydrate. Yield: 81.5%. After recrystallisation from ethanol the salt melts at 258–260° C. (decomposition).

*Analysis.*—Calculated for $C_{17}H_{19}ON_2Cl$ (percent): C, 67.43; H, 6.32; N, 9.26; Cl, 11.71. Found (percent): C, 66.63; H, 6.37; N, 9.21; Cl, 11.68.

(g) By refluxing the oily free base at 40° C. with an excess of methyliodide for 15 minutes, followed by evaporation, the methiodide is obtained which melts at 261–264° C., while treating the free base with periodic acid yields the corresponding nitrogen oxide.

EXAMPLE II (a) Ortho-chloroacetamido-diphenylthioether

A solution of 33 ml. of chloroacetyl chloride in 66 ml. of benzene is added dropwise, while stirring, to a solution of 4.2 gm. of ortho-amino-diphenylthioether in a mixture of 220 ml. of benzene and 132 ml. of a concentrated solution of sodium hydroxide, cooled down to 5–10° C. Then the mixture is heated to room temperature, which temperature is maintained for 2 hours, while stirring. The organic layer is separated, washed with 2 N hydrochloric acid and then with water, after which it is dried on anhydrous sodium sulphate. After evaporation of the solvent 40 gm. of the crystalline product is obtained. Melting point: 64–68° C.; yield: 64%. Melting point of the crystals after recrystallisation: 67–69° C.

*Analysis.*—Calculated for $C_{14}H_{12}OSNCl$ (percent): C, 60.54; H, 4.36; N, 5:04; Cl, 12.76. Found (percent): C, 60.42; H, 4.50; N, 5.06; Cl, 12.66.

(b) 11-chloromethyl-dibenzo-(b,f)(1,4)-thiazepine

A mixture of 5 gm. of ortho-chloroacetamido-thioether, 7 ml. of phosphoroxy chloride and 40 gm. of polyphosphoric acid is heated for 2 hours at 120–130° C. in nitrogen atmosphere, while stirring. After cooling down the mixture it is poured on 150 gm. of ice and then extracted with benzene. The organic extracts are combined, then washed with a 10% sodium carbonate solution and with water. After drying the extracts on anhydrous sodium sulphate and evaporation 4.4 gm. of crystalline substance is obtained. Melting point: 101–103° C.; yield: 94%. Melting point after recrystallisation from methanol of part of this substance: 103–104° C.

*Analysis.*—Calculated for $C_{14}H_{10}NSCl$ (percent): C, 64.76; H, 3.82; N, 5.41; S, 12.35; Cl, 13.66. Found (percent): C, 64.29; H, 3.70; N, 5.76; S, 12.55; Cl, 13.89.

(c) 11-methylaminomethyl-dibenzo-(b,f)(1,4)-thiazepine

A solution of 2.5 gm. of the above chloromethyl derivative in 50 ml. of a solution of methylamine (14%) in benzene is kept at 5–10° C. for 24 hours. Then the solution is washed with water, dried on anhydrous sodium sulphate and evaporated to obtain 2.25 gm. of an oily substance, which is directly converted further.

(d) 11-methylaminomethyl-10,11-dihydro-dibenzo-(b,f)(1,4)-thiazepine

A solution of 2.25 gm. of the above product was 25 ml. of anhydrous ether is added dropwise to a suspension of 600 mg. of lithium aluminum hydride in 25 ml. of ether cooled down to 5° C. Then the mixture is refluxed for 2 hours, and cooled down. After processing the mixture in the conventional manner 2.1 gm. of an oily product is obtained, which is directly converted further.

(e) 2(N)-methyl-1,3,4,14b-tetrahydro-3,4-dioxo-2H-pyrazino-(1,2-d)-dibenzo-(b,f)(1,4)-thiazepine A mixture of 2.1 gm. of the above oily product and 2.1 ml. of diethyl oxalate is heated from 20 to 180° C. in 30 minutes on a metal bath, which temperature is maintained for 90 minutes. After cooling down the mixture and diluting it with ether 1.35 gm. of crystalline product is obtained. Melting point: 260–265° C.; yield: 45% (calculated on the chloromethyl derivative). After recrystallisation of this product is dimethylformamide crystals are obtained with a melting point of 263–267° C.

*Analysis.*—Calculated for $C_{17}H_{14}O_2N_2S$ (percent): C, 65.79; H, 4.55; N, 9.03; S, 10.33. Found (percent): C, 65.80; H, 4.73; N, 10.00; S, 9.95.

(f) 2(N)-methyl-1,3,4,14b-tetrahydro-2H-pyrazino-(1,2-d)-dibenzo-(b,f)(1,4)-thiazepine A solution of 5 gm. of the above diketo piperazine in 250 ml. of anhydrous tetrahydrofuran is reduced by the method of Example If. The required diboran is obtained by treating a suspension of 5 gm. of sodium borohydride in 19 ml. of dimethoxy diethylether with a solution of 21.5 ml. of boron trifluoride etherate in 4.5 ml. of di-methoxy-diethylether to obtain 3 gm. of an oily substance in a yield of 66%. This substance is converted into the hydrochloride, which is recrystallised in ethanol to obtain a product with a melting point of 250–255° C. (decomposition).

*Analysis.*—Calculated for $C_{17}H_{19}N_2SCl$ (percent): C, 64.04; H, 6.01; S, 10.03; N, 8.79; Cl, 11.13. Found (percent): C, 64.15; H, 6.16; S, 9.82; N, 8.29; Cl, 11.21.

(g) The base according to (f) is heated with methyliodide, refluxed and evaporated to obtain the methiodide, which melts at 230–233° C.

(h) The thiazepine according to (f) is converted into the corresponding sulfoxyde with $H_2O_2$ after which this substance is converted into the corresponding sulfone by refluxing with periodic acid.

(j) In the same manner 2(N),7-dimethyl-1,3,4,14b-tetrahydro-2H - pyrazino-(1,2-d) - dibenzo-(b,f)(1,4)-thiazepine is prepared and isolated as the maleate starting from ortho-chloro-acetamido-para-methyl-diphenyl-thioether.

(k) In the same manner the 2(N)-methyl-7-chloro, respectively the 2(N),8-dimethyl-derivatives are obtained, and converted into the maleates and further oxidized to the corresponding oxydes.

EXAMPLE III (a) N-methyl-ortho-chloroacetamido-diphenylamine

A solution of 3 ml. of chloroacetyl chloride in 6 ml. of benzene is added dropwise while stirring at a temperature of 5–10° C. to a solution of 4 gm. of ortho-amino-N-methyl-diphenylamine in 20 ml. of benzene and 12 ml. of a concentrated sodium hydroxide solution. Then the mixture is raised to room temperature. This temperature is maintained for 2 hours while stirring. After processing the mixture in the conventional manner 3.5 gm. of a crystalline substance is obtained with a melting point of 67–68° C.; yield: 63%. Melting point after recrystallisation in a mixture of ethyl acetate and petroleum-ether: 78–79° C.

*Analysis.*—Calculated for $C_{15}H_{15}ON_2Cl$ (percent): C, 65.57; H, 5.50; N, 10.20; Cl, 12.90. Found (percent): C, 65.78; H, 5.66; N, 10.17; Cl, 13.15.

(b) 5-methyl-11-chloromethyl-5H-dibenzo-(b,e)(1,4)-diazepine

A mixture of 500 gm. of phosphorpentoxide, 400 ml. of anhydrous ether and 670 ml. of chloroform is refluxed for 16 hours while stirring vigorously. After cooling down the solution it is decanted and evaporated to obtain 350 gm. of polyphosphate ester.

A suspension of 20.2 gm. of the above chloroacetamide in 140 gm. of the polyphosphate ester is heated for 1 hour in nitrogen atmosphere at 120–130° C. After cooling down the mixture it is poured on 500 gm. of finely broken ice. Then the resulting aqueous suspension is extracted with ether and the organic extracts are combined, washed with water and dried on anhydrous sodium sulphate. After evaporation a crude product is obtained (17 gm.), which is taken up in 150 ml. of methylene-chloride. This solution is filtered through 250 gm. of florisil 30–40, a synthetic magnesium silicate. After evaporation a crystalline product is obtained (14 gm.). Melting point: 98–100° C.; yield: 75%. Melting point after recrystallisation in ethanol: 100.5–102.5° C.

(c) 5-methyl-11-methylaminomethyl-5H-dibenzo-(b,e)(1,4)-diazepine 600 ml. of liquid methylamine is passed into a 2000-ml. flask fitted with a cooler with a chlorocalcium tube, while cooling. The methylamine is heated at −10 to −15° C. Then 19.5 gm. of the above chloromethyl derivative is added in 1 hour, while stirring. Then the temperature of the mixture is maintained at −5° C. for 2 hours, while stirring. Then the methylamine is evaporated; traces thereof are removed in vacuo. The residue is taken up in ether, whereupon the solution is filtered, dried on anhydrous sodium sulphate and evaporated to obtain 19 gm. of an oily substance, which is directly converted further.

(d) 5-methyl-10,11-dihydro-11-methylaminomethyl-5H-dibenzo-(b,e)(1,4)-diazepine

Nineteen grams of the above prepared oily substance is dissolved in 400 ml. of anhydrous ether. The solution is added dropwise, at room temperature, to a suspension of 8 gm. of lithium aluminum hydride in 250 ml. of anhydrous ether, in nitrogen atmosphere. Then the mixture is refluxed for 90 minutes, after which it is cooled down. Then 32 ml. of water is added. After filtration of the mixture over anhydrous sodium sulphate it is evaporated to obtain 17.5 gm. of an oily product, which is directly processed further.

(e) 2(N),10(N)-dimethyl-1,2,3,4,10,14b-hexahydro-3,4-dioxo-pyrazino-(1,2-d)-dibenzo-(b,f)(1,4)-diazepine A solution of 17.5 gm. of the above product in 17.5 ml. of diethyloxalate is heated in 45 minutes from 20 to 170° C. on a metal bath, in nitrogen atmosphere, and then for 45 minutes at 170–175° C. Then the solution is cooled down, diluted with ether and filtered to obtain 14 gm. of crystalline product. Melting point: 170–180° C.; yield: 60%.

(f) 2(N),10(N)-dimethyl-1,2,3,4,10,14b-hexahydro-pyrazino-(1,2-d)-dibenzo-(b,f)(1,4)-diazepine A solution of 10 gm. of the above diketo piperazine in 350 ml. of tetrahydrofuran is treated with diboran in accordance with Example If. The required quantity of diboran is obtained by treating a suspension of 12 gm. of sodium borohydride in 50 ml. of dimethoxy-diethylether with 50 ml. of boron trifluoride-etherate in 10 ml. of dimethoxy-diethylether. After processing the suspension in the conventional manner an oily product is obtained (6.2 gm.) in a yield of 68%, which is converted into the hydrochloride. After recrystallisation from a mixture of ethanol and ether a product is obtained which decomposes at 215–217° C.

(g) The free base according to (f) is refluxed with methyliodide and evaporated to obtain quantitatively the methiodide, which melts at 200–203° C.

(h) In analogous manner the maleate of the corresponding 7-methyl-derivative is obtained.

EXAMPLE IV (a) 8-methyl-11-chloromethyl-dibenzo-(b,f)(1,4-)-oxazepine

Ortho-chloroacetamido-para-methyl-diphenylether, melting point 85–87° C., is converted with phosphoroxy chloride and polyphosphoric acid by the method of Example Ib to obtain a crystalline product in a yield of 89%. Melting point: 118–119° C.

(b) 2(N),7 - dimethyl-1,3,4,14b-tetrahydro-3,4-dioxo-2H-pyrazino-(1,2-d)-dibenzo-(b,f)(1,4)-oxazepine The above product is reacted with methylamine in accordance with Example Ic, after which the double bond between the 10- and 11-position is reduced in the manner of Example Id and the resulting 8-methyl-11-methylamino-10,11-dihydro-dibenzo-(b,f)(1,4)-oxazepine is converted into the desired product by condensation with dietheyloxalate in accordance with Example Ie. Melting point: 195–196° C.; yield: 46% (calhulated on the chloromethyl derivative).

(c) 2(N),7 - dimethyl - 1,3,4,14b-tetrahydro-2H-pyrazino-(1,2-d)-dibenzo-(b,f)(1,4)-oxazepine The above substance is reduced with diboran in accordance with Example If to the desired product, which after isolation is converted into the maleate. Melting point 222–223° C.; yield: 84% or into the methiodide, which decomposes at 160° C.

(d) In an analogous manner 2(N)-methyl,7-chloro, respectively 7-methoxy-1,3,4-14b-tetrahydro-2H-pyrazino-(1,2-d)-dibenzo-(b,f)(1,4)-oxazepine is prepared and converted into the maleate starting from ortho chloro-acetamido-para chloro respectively para methoxy-diphenylether.

EXAMPLE V (a) 2(N),13-dimethyl-1,3,4,14b-tetrahydro-3,4-dioxo-2H-pyrazino-(1,2-d)-dibenzo-(b,f,)(1,4)-oxazepine From 2-chloroacetamido-4'-methyl-diphenylether, melting point 64–65° C., the 2-methyl-11-chloromethyl-dibenzo-(b,f)(1,4)-oxazepine is prepared with phosphoroxy chloride and polyphosphoric acid by the process of Example Ib. Then this substance is reacted with methylamine, whereupon after isolation of the product formed, the double bond between the 10 and the 11-position is reduced with LiAlH$_4$. Finally the substance is condensed with diethyl oxalate to the pyrazino compound. Melting point 295–298° C.

(b) 2(N),13-dimethyl-1,3,4,14b-tetrahydro-2H-pyrazino-(1,2-d)-dibenzo-(b,f)(1,4)-oxazepine The above dioxo compound is reduced with diboran in a current of nitrogen by the method of Example If. The isolated final product is converted into the monochloro hydrate, which melts at 195–196° C. Yield: 83%. The maleate melts at 165–166° C.

(c) In an analogous manner the 13-trifluoro methyl derivative is prepared and isolated as the HCl-salt.

EXAMPLE VI (a) 4-methyl-11-chloromethyl-dibenzo-(b,f)(1,4)-oxazepine

2 - chloroacetamido - 2'- methyl-diphenylether is heated with phosphoroxy chloride and polyphosphoric acid, whereupon the above substance is isolated from the reaction mixture. Melting point 90–91° C.

(b) 2(N),11-dimethyl-1,3,4,14b-tetrahydro-3,4-dioxo-2H-pyrazino-(1,2-d)-dibenzo-(b,f)(1,4)-oxazepine The above compound is reacted with methylamine, after which the resulting oily 4-methyl-11-methylaminomethyl-dibenzo-(b,f)(1,4)-oxazepine is reduced with lithium aluminium hydride and directly converted further with diethyl oxalate in accordance with Example Ie. The dioxo compound formed melts at 225–230° C.

(c) 2(N),11-dimethyl-1,3,4,14b-tetrahydro-2H-pyrazino-(1,2-d)-dibenzo-(b,f)(1,4)-oxazepine The above crystalline product is dissolved in tetrahydrofuran and reduced with diboran in nitrogen atmosphere. After isolation in accordance with Example If, the desired base is obtained from the reaction mixture, which forms a maleate with a melting point of 180–183° C. At the same time the HCl-salt is prepared.

(d) In an analogous manner the 11-ethyl derivative is obtained and converted into the HCl-salt.

EXAMPLE VII (a) 3,4-dimethyl-11-chloromethyl-dibenzo-(b,f)(1,4)-oxazepine

By heating a mixture of 1-chloroacetamido-2'3'-dimethyl-diphenylether, melting point 117–119° C., phosphoroxy chloride and polyphosphoric acid in nitrogen atmosphere the desired substance is obtained, which after cooling down of the reaction mixture and extraction is isolated and melts at 102–103° C.

(b) 2(N),11,12-trimethyl-1,3,4,14b-tetrahydro-3,4-dioxo-2H-pyrazino-(1,2-d)-dibenzo-(b,f)(1,4-)-oxazepine The above product is converted into the oily 11-methylaminoethyl compound with a solution of methylamine in benzene. Then the resulting compound is dissolved in anhydrous ether, whereupon the solution is added dropwise to a suspension of lithium aluminium hydride in anhydrous ether cooled down to 5° C. Then the mixture is refluxed and cooled down, whereupon a little water is added. After drying on anhydrous sodium sulphate and evaporation of the mixture the 10,11-dihydro compound is obtained, which is directly processed further with dimethyl oxalate in accordance with Example Ie to obtain the 3,4-dioxo-pyrazino compound. Melting point 242–343° C.

(c) 2(N),11,12-trimethyl-1,3,4,14b-tetrahydro-2H-pyrazino-(1,2-d)-dibenzo-(b,f)(1,4)-oxazepine The above substance is reduced in a dry current of nitrogen with diboran in the conventional manner. The final product is isolated and purified in a known manner. The maleate melts at 180–188° C.

(d) In the same manner 2(N)-propyl, respectively 2(N)-phenylethyl-11,12-dimethyl - 1,3,4,14b - tetrahydro-3,4-dioxo-2H-pyrazino - (1,2-d) - dibenzo-(b,f)(1,4)-oxazepine is obtained by means of a solution of n-propylamine, respectively phenylethylamine in benzene according to (b), after which these compounds are reduced with hydrogen and Adams catalyst to the 2(N)-propyl, respectively 2(N)-phenylethyl-1,12-dimethyl derivative, according to the formula of the final products and converted into the maleates.

EXAMPLE VIII (a) 11-n.propylaminomethyl-dibenzo-(b,f)(1,4)-oxazepine

The chloro atom in 11-chloromethyldibenzo-(b,f)(1,4)-oxazepine is substituted in the manner of example Ic by an n.propyl group with n.propylamine in benzene. The temperature of the solution is maintained at about 5° C. for 24 hours, after which the solution is washed and dried on anhydrous sodium sulphate and evaporated. The resulting oily product is directly processed further.

(b) 2(N)-n.propyl-1,3,4,14b-tetrahydro-3,4-dioxo-2H-pyrazino-(1,2-d)-dibenzo-(b,f)(1,4)-oxazepine The above substance is heated with diethyl oxalate on a metal bath to 180° C. in 30 minutes, which temperature is maintained for one and a half hours. The substance is cooled down and diluted with ether to obtain the desired crystalline substance with a melting point of 196–199° C.

(c) 2(N)-n.propyl-1,3,4,14b-tetrahydro-2H-pyrazine-(1,2-d)-dibenzo-(b,f)(1,4)-oxazepine The above dioxo compound is reduced by the method of example If to the desired final product, which is oily and yields a crystallized maleate with a melting point of 187–188° C.

(d) In the same manner the 2(N)-propyl,7-hydroxy derivative, the 2(N)-propyl, 7-methoxy derivative and the 2(N)-propyl,7-methyl derivative are obtained and converted into the maleates.

EXAMPLE IX (a) 2(N)-methyl-13-chloro-1,3,4,14b-tetrahydro-3,4-dioxo-2H-pyrazino-(1,2-d)-dibenzo-(b,f)(1,4)-oxazepine From 2-amino-4'-chloro-phenylether the 2 - chloroacetamido derivative is prepared with chloroacetyl chloride by the method described before. Then this derivative is converted with phosphoroxy chloride and polyphosphoric acid into the 2-chloro - 11 - chloromethyl-dibenzo-(b,f)(1,4)-oxazepine. After substitution of the chloro atom of the chloromethyl group by a methylamino group, reduction of the double bond 10–11 by one of the methods described before, and ring closure with diethyl oxalate the desired product is obtained, which melts at 221–223° C.

(b) 2(N)-methyl-13-chloro-1,3,4,14b-tetrahydro-2H-pyrazino-(1,2-d)-dibenzo-(b,f)(1,4-oxazepine The above compound is reduced to the described final product by reduction with diboran and yields after conversion the maleate with a melting point of 165–167° C.

EXAMPLE X (a) 2(N)-ethyl-10(N)-methyl-1,2,3,4,10,14b-hexahydro-3,4-dioxo-pyrazino-(1,2-d)-dibenzo-(b,f)(1,4)-diazepine From the final product of Example IIIb, 5-methyl-11-chloromethyl - 5H - dibenzo-(b,e)(1,4)-diazepine, the 5-methyl-5H-dibenzo - (b,e)(1,4) - diazepine is prepared with ethylamine by the process of Example IIIc. The product obtained is an oily substance, which is not purified, but dissolved in ethanol and reduced in nitrogen atmosphere at 10° C., for 1 hour, with NaBH₄. The resulting 10,11-dihydro compound, which is oily, is heated with diethyl oxalate on a metal bath in nitrogen atmosphere and yields the crystalline final product. Melting point: 155–158° C.; yield: 62%.

(b) 2(N)-ethyl-10(N)-methyl-1,2,3,4,10,14b-hexahydro-pyrazino-(1,2-d)-dibenzo-(b,f)(1,4)-diazepine The above dioxo compound is dissolved in anhydrous tetrahydrofuran and reduced with diboran taken up in a dry current of nitrogen. This diboran is obtained by adding a solution of boron trifluoride-etherate in dimethoxy-diethyl-ether to a suspension of NaBH₄ in the same solvent, while stirring. The suspension is refluxed and then cooled down to 8° C., whereupon ethanol is added till the precipitate has disappeared. Then the reaction mixture is processed in accordance with Example If to obtain a crystalline monochlorohydrate with a melting point of 180–185° C. (decomposition).

EXAMPLE XI (a) 5-n.propyl-11-chloromethyl-5H-dibenzo-(b,e)(1,4)-diazepine

N-n.propyl - ortho - chloroacetamido - diphenylamine, melting point 78–80° C., is heated for 1 hour in nitrogen atmosphere at 30° C. with polyphosphate ester by the method of Example IIIb. Then the mixture is cooled down and poured out on ice. Then the mixture is extracted and processed to obtain a crystalline substance with a melting point of 75–79° C.

(b) 2(N) - methyl-10(N)-n.propyl-1,2,3,4,10,14b-hexahydro-3,4-dioxo-pyrazino - (1,2-d) - dibenzo-(b,f)(1,4) diazepine The above chloromethyl compound is converted with methylamine into the corresponding methylaminomethyl compound by the process of Example IIIc. This compound is isolated as an oil, then treated with NaBH₄ in ethanol for 30 minutes at 10° C. and converted into the corresponding 10-11-dihydro compound, which is also oily. This compound is dissolved in diethyl oxalate and heated on a metal bath to 170° C. in 50 minutes, in nitrogen atmosphere. After processing the solution a crystalline product is obtained with a melting point of 135–140° C.

(c) 2(N)-methyl-10(N)-n.propyl-1,2,3,4,10,14b-hexahydro-pyrazino-(1,2-d)-dibenzo-(b,f)(1,4)-diazepine The above dioxo product is dissolved in tetrahydrofuran and then treated with diboron in accordance with Example If to reduce the oxo groups. After processing the product in the conventional manner the resulting oily compound is converted into the hydrochloride, which melts at 180–183° C.

EXAMPLE XII (a) 2-(N)-cyano-1,3,4,14b-tetrahydro-2H-pyrazino-(1,2-d)-dibenzo-(b,f)(1,4)-oxazepine A solution of 13 gm. of 2(N)-methyl-1,3,4,14b-tetrahydro-2H-pyrazino-(1,2-d) - dibenzo - (b,f)(1,4)-oxazepine in 66 ml. of benzene is added dropwise in 2½ hours, while stirring and at room temperature, to a solution of 6.2 gm. of BrCN in 66 ml. of benzene. The reaction mixture becomes slowly turbid and an oil separates. Then the mixture is left to stand overnight, whereupon 200 ml. of 5% hydrochloric acid is added and the mixture is stirred. The layers formed are separated. The organic layer is washed twice with 100 ml. of water, then dried by mixing it with anhydrous chlorocalcium and finally evaporated to obtain a clear oil, which is directly converted further.

(b) 1,3,4,14b-tetrahydro-2H-pyrazino-(1,2-d)-dibenzo-(b,f)(1,4)-oxazepine

The above cyano compound (8.2 gm.) is refluxed for 28 hours with 40 ml. of water and 40 ml. of 36% hydrochloric acid. Then the mixture is cooled down, after which the hydrochloride of the base crystallises, which is washed with water, alcohol and ether, after which it melts at 270–273° C. (decomposition).

In the same manner the hydrochloride is prepared of the 1,3,4,14b-tetrahydro - 2H - pyrazino-(1,2-d)-dibenzo-(b,f)(1,4)-thiazepine, melting point 259–263° C. (decomposition) from the corresponding 2(N)-methyl compound via the 2(N)-cyano compound. In the same manner 2(N)-10(N)-dimethyl-1,2,3,4,10,14b-hexahydropyrazino-(1,2-d)dibenzo-(b,f)(1,4)-diazepine is demethylated in the 2-position. Melting point of the resulting base: 170–175° C.

The latter product is converted with

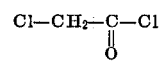

into the corresponding 2(N)-chloro acetyl derivative followed by reaction with dimethylamine and reduction with LiAlH₄ to obtain the corresponding 2(N)-dimethylamino ethyl derivative.

What is claimed is:

1. A compound selected from the group consisting of a compound of the formula:

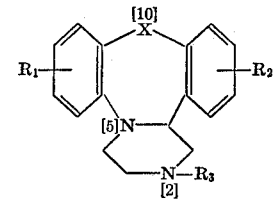

in which:

X is selected from the group consisting of sulfur, oxygen, S→O, and N-(C₁-C₆-alkyl);

R₁ and R₂ are selected from the group consisting of hydrogen, halogen, hydroxy, alkyl having 1 to 6 carbon atoms, alkoxy having 1 to 6 carbon atoms, and trifluoromethyl;

R₃ is selected from the group consisting of hydrogen, alkyl having 1 to 6 carbon atoms, and phenylethyl;

and the pharmaceutically acceptable N(2)-acid addition salts, N(2)-(C₁-C₃)-lower alkyl quaternary ammonium compounds thereof, and the N(2)-oxides of those compounds in which X is oxygen, S→O, or N-(C₁-C₆-alkyl).

2. A compound selected from the group consisting of a compound of the formula:

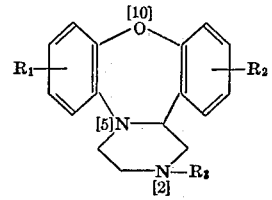

in which:

R₁ and R₂ are selected from the group consisting of hydrogen, halogen, hydroxy, alkyl having 1 to 6 carbon atoms, alkoxy having 1 to 6 carbon atoms, and trifluoromethyl;

R₃ is selected from the group consisting of hydrogen, alkyl having 1 to 6 carbon atoms, and phenylethyl;

and the pharmaceutically acceptable N(2)-acid addition salts, N(2)-C$_1$–C$_3$)-lower alkyl quaternary ammonium compounds, and N(2)-oxides thereof.

3. A compound selected from the group consisting of a compound of the formula:

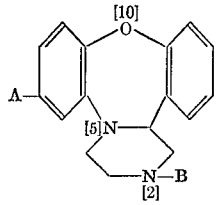

in which:

A is selected from the group consisting of hydrogen and methyl; and B is alkyl having 1 to 6 carbon atoms;

and the pharmaceutically acceptable N(2)-acid addition salts, N(2)-(C$_1$–C$_3$)-lower alkyl quaternary ammonium compounds, and N(2)-oxides thereof.

4. A compound selected from the group consisting of a compound of the formula:

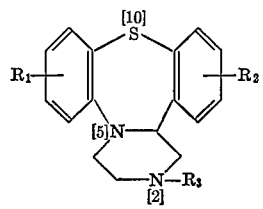

in which:

R$_1$ and R$_2$ are selected from the group consisting of hydrogen, halogen, hydroxy, alkyl having 1 to 6 carbon atoms, alkoxy having 1 to 6 carbon atoms, and trifluoromethyl;

R$_3$ is selected from the group consisting of hydrogen, alkyl having 1 to 6 carbon atoms, and phenylethyl;

and the pharmaceutically acceptable N(2)-acid addition salts, and N(2)-(C$_1$–C$_3$)-lower alkyl quaternary ammonium compounds thereof.

5. A compound selected from the group consisting of a compound of the formula:

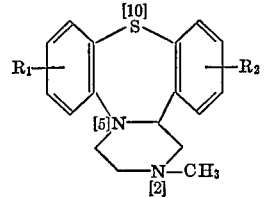

in which:

R$_1$ and R$_2$ are selected from the group consisting of hydrogen, halogen, hydroxy, alkyl having 1 to 6 carbon atoms, alkoxy having 1 to 6 carbon atoms, and trifluoromethyl;

and the pharmaceutically acceptable N(2)-acid addition salts, and N(2)-(C$_1$–C$_3$)-lower alkyl quaternary ammonium compounds thereof.

6. A compounde selected from the group consisting of a compound of the formula:

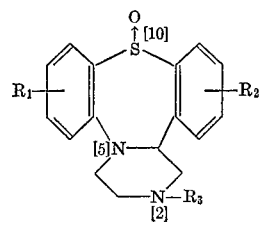

in which:

R$_1$ and R$_2$ are selected from the group consisting of hydrogen, halogen, hydroxy, alkyl having 1 to 6 carbon atoms, alkoxy having 1 to 6 carbon atoms, and trifluoromethyl;

R$_3$ is selected from the group consisting of hydrogen, alkyl having 1 to 6 carbon atoms, and phenylethyl;

and the pharmaceutically acceptable N(2)-acid addition salts, N(2)-(C$_1$–C$_3$)-lower alkyl quaternary ammonium compounds, and N(2)-oxides thereof.

7. A compound selected from the group consisting of a compound of the formula:

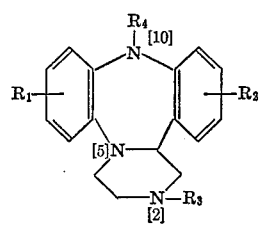

in which:

R$_1$ and R$_2$ are selected from the group consisting of hydrogen, halogen, hydroxy, alkyl having 1 to 6 carbon atoms, alkoxy having 1 to 6 carbon atoms, and trifluoromethyl;

R$_3$ is selected from the group consisting of hydrogen, alkyl having 1 to 6 carbon atoms, and phenylethyl;

R$_4$ is alkyl having 1 to 6 carbon atoms;

and the pharmaceutically acceptable N(2)-acid addition salts, N(2)-(C$_1$–C$_3$)-lower alkyl quaternary ammonium compounds, and N(2)-oxides thereof.

References Cited

UNITED STATES PATENTS

| | | | |
|---|---|---|---|
| 3,200,120 | 8/1965 | Lovell | 260—268 TR |
| 3,534,041 | 10/1970 | Vanderburg et al. | 260—268 PC |

OTHER REFERENCES

Burger, Medicinal Chemistry, 2d ed. Interscience, 1960, p. 42.

DONALD G. DAUS, Primary Examiner

U.S. Cl. X.R.

260—239 R; 424—250